Nov. 23, 1937.     G. A. MACREADY     2,099,859
COLLAPSIBLE ROTARY CORE DRILL
Filed April 16, 1935     3 Sheets-Sheet 1

INVENTOR.
George A. Macready

Nov. 23, 1937.    G. A. MACREADY    2,099,859
COLLAPSIBLE ROTARY CORE DRILL
Filed April 16, 1935    3 Sheets-Sheet 2

INVENTOR.
George A. Macready

Nov. 23, 1937.  G. A. MACREADY  2,099,859
COLLAPSIBLE ROTARY CORE DRILL
Filed April 16, 1935  3 Sheets-Sheet 3
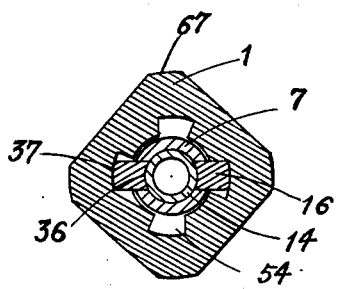
Fig. 16.
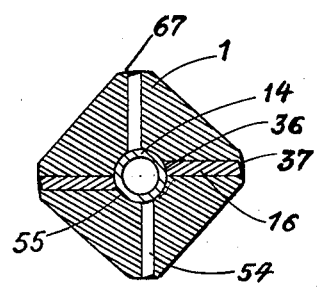
Fig. 17.
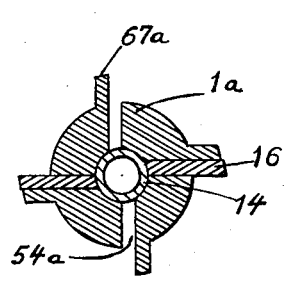
Fig. 17a.
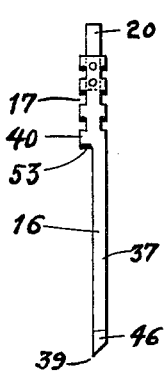
Fig. 19.
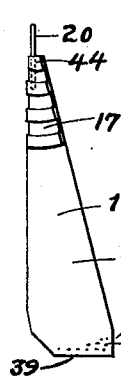
Fig. 20. Fig. 21. Fig. 22.
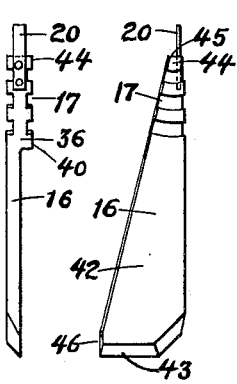
Fig. 23.
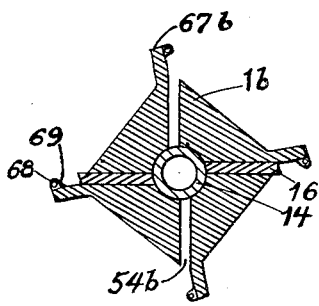
Fig. 17b.
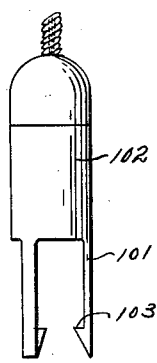
Fig. 24.
Fig. 18.
INVENTOR.
George A. Macready Patented Nov. 23, 1937

2,099,859

UNITED STATES PATENT OFFICE 2,099,859

COLLAPSIBLE ROTARY CORE DRILL

George A. Macready, Los Angeles, Calif.

Application April 16, 1935, Serial No. 16,650

28 Claims. (Cl. 255—72)

My invention relates to improvements in rotary well drilling equipment. It relates particularly to rotary drills in which the cutters are installed and removed through the drill pipe or drill rod without removing the drill pipe from the well. My invention relates furthermore to core drilling equipment.

The usual practice in rotary drilling is to attach the cutters, bits, or core drill to the lower end of the drill pipe by screw threads, lower the drill pipe into the well, operate the cutters by rotation of the drill pipe and simultaneously remove the cuttings by liquid pumped through the drill pipe to the cutters, and remove the drill pipe from the well when the cutters become dull. In deep wells the operation of pulling and installing drill pipe often consumes over half the time of the crew, particularly when core drilling, so that the actual time that the cutters are on bottom doing useful work is a relatively small portion of the total time. By the use of my collapsible rotary core drill the necessity of removing and installing pipe to change cutters is eliminated with the result of great saving in time. Since it often costs over $200 per day to operate a modern rotary drilling outfit the saving of even 10% of the time is an important economy. With my drill the saving is greatest when core drilling.

An object of my invention is an improved form of lock device for the upper end of the interior organization of my collapsible rotary core drill.

An object of my invention is to provide a drill in which blades are lowered through the drill pipe and expanded to operating position at the lower end by a cutter bit movable between blades.

An object of my invention is to provide a rotary core drill in which the core barrel and cutters can be removed and replaced without removing the drill pipe from the well, the bit of the core barrel being used to expand blades that ream under the drill pipe.

An object of my invention is to provide an efficient simplified form of rotary core drill in which core barrel and cutters can be removed and replaced without removing the drill pipe from the well.

An object of my invention is to provide a rotary core drill having telescopically connected tubes.

An object of my invention is to provide a carrier of novel design for removing and replacing cutters in a drill without removing the drill pipe from the well.

An object of my invention is to provide a novel form of circulation outlet for a drill in which the cutters can be changed without removing the drill pipe from the well.

An object of my invention is to provide a novel arrangement of guides for seating removable blades.

An object of my invention is to provide a novel form of terminal fitting or shoe to receive removable blades in a drill.

An object of my invention is to provide a novel form of blade construction to facilitate efficient interchange of blades in a drill without removing the drill pipe from the well.

With the foregoing and other objects in view which will be made manifest in the following detailed description and especially pointed out in the appended claims, reference is had to the accompanying drawings for illustrative embodiment of my invention, wherein:

Figure 1 is a view of the exterior organization showing the blades of the interior organization projecting from the lower end thereof, Figure 2 is a longitudinal sectional view of the device shown in Figure 1, Figure 3 is a view of the interior organization or carrier with the mandril withdrawn from between the blades so that they are collapsed sufficiently to pass through the upsets of the drill pipe, Figure 4 is a view of the lower portion of the interior organization or carrier at right angles to Figure 3, Figure 5 is a longitudinal section of the shoe or lower member of the outer organization with the carrier removed to show the guide ribs and bevels on the interior surface, Figure 6 is a cross section at line 6—6', in Figure 2, Figure 7 is a cross section at line 7—7', in Figure 2, Figure 8 is a cross section at line 8—8', in Figure 2, Figure 9 is a cross section at line 9—9', in Figure 2, Figure 10 is a cross section at line 10—10', in Figure 2, Figure 10a is a cross section of a modified construction of the structure illustrated in Figure 10, Figure 11 is a cross section at line 11—11', in Figure 2, Figure 12 is a cross section at line 12—12', in Figure 2, Figure 13 is a cross section at line 13—13', in Figure 2, Figure 14 is a cross section at line 14—14', in Figure 2, Figure 15 is a cross section at line 15—15', in Figure 2, Figure 16 is a cross section at line 16—16', in Figure 2, Figure 17 is a cross section at line 17—17', in Figure 2, Figure 17a is a cross section of a modified construction of the structure illustrated in Figure 17, Figure 17b is a cross section of another modified construction of the structure illustrated in Figure 17 in which reaming fins are illustrated on the shoe, Figure 18 is a cross section at line 18—18', in Figure 2, Figure 19 is a view of the outer face of a cutter blade.

Figure 20 is a view of the advance face of a cutter blade,

Figure 21 is a view of the inner face of a cutter blade,

Figure 22 is a view of the rear face of a cutter blade,

Figure 23 is a view of the lower portion of the exterior organization at right angles to the view of Figure 1, and Figure 24 is a sectional view of an installation tool used for lowering the drill carrier by cable.

Similar numerals refer to similar parts throughout the several views.

Figure 1:
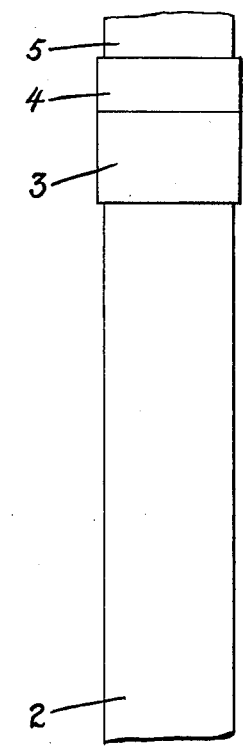
Figure 1:
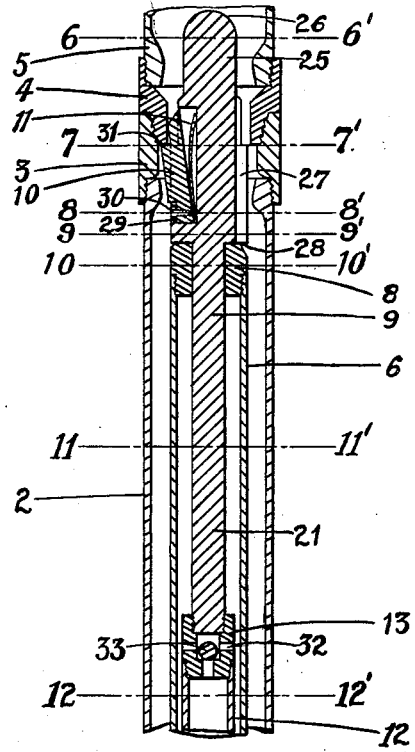
Figure 1:
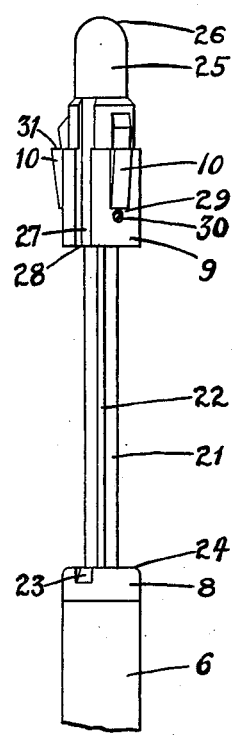
Figure 1:
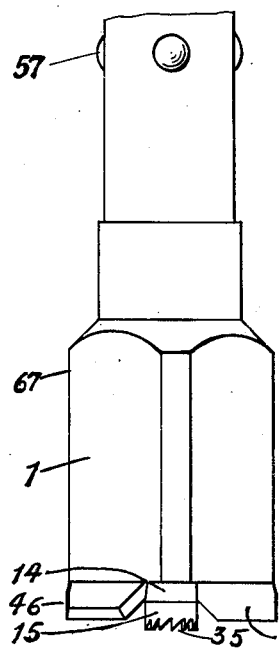

The exterior organization of my core drill is shown in Figure 1 attached to the lower end of a string of rotary drill pipe. This organization consists of a lower member or shoe 1 the detailed construction of which will be described hereinafter, an outer tube 2 which can be a piece of rotary drill pipe of standard specifications, a tool joint box 3, and a tool joint pin 4, the latter being attached as by screw threads to the lower end of the string of rotary drill pipe 5.

The string of drill pipe 5 illustrated in the drawings is of the conventional internally upset rotary drill pipe used in modern oilfield practice. For efficient operation of my drill it is advisable to use tool joint couplings having an internal bore not smaller than the bore of the upsets. My drill can also be used with other forms of drill rod, particularly drill pipe of flush internal diameter. Collars having rubber jackets moulded thereon can be used instead of tool joints to prevent joints rusting or freezing together and at the same time prevent wear on the well casing.

During drilling the drill pipe and outer organization remain in the well for an indefinite length of time because it is not necessary to remove them to replace the dull cutters with sharp cutters.

Figure 2:
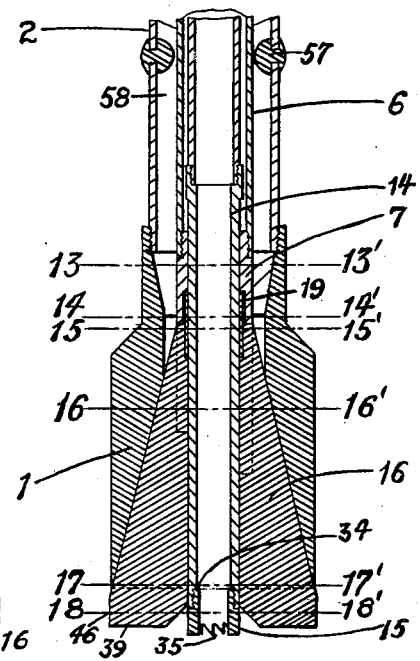
Figure 3:
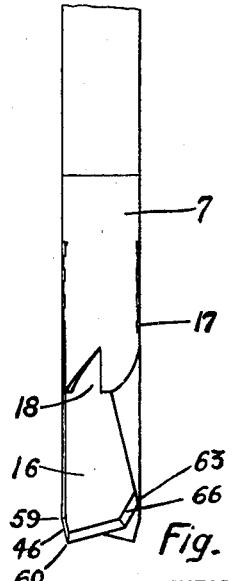
Figure 4:
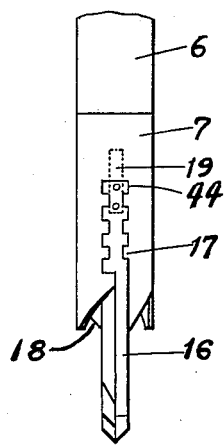
Figure 6:
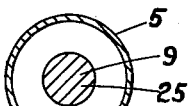
Figure 11:
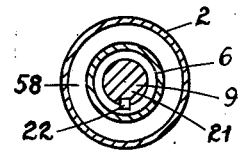
Figure 7:
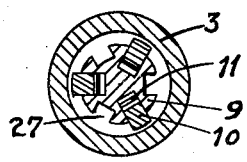
Figure 12:
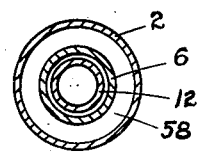

The cutters are changed by means of the bodily removable interior organization or carrier. Views of the carrier are shown in Figures 3 and 4 and it is also shown in longitudinal section inside the outer organization in Figure 2.

The carrier consists of a carrier tube 6 having a fork or tip 7 attached to the lower end and a sleeve 8 attached as by screw threads to the upper end: a lock head 9 having barbs or lugs 10 urged outwardly by a spring 11: a core receiving tube 12 having a coupling 13 at the upper end for attachment to the lock head, a lower mandril section 14, and a core cutting shoe 15 attached to the lower end: and collapsible blades 16 supported by dovetail connection with tip 7.

Figure 10A:
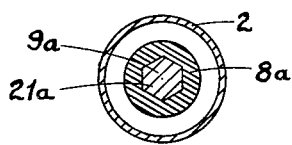
Figure 8:
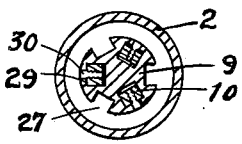
Figure 13:
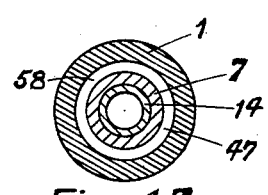

The carrier tube 6 can be a plain tube threaded at each end for connection to tip 7 and sleeve 8. Left hand threads should be used when operated with the conventional right hand thread drill pipe. The fork or tip 7 is provided with a pair of longitudinal slots at the lower end having their sides notched as at 17 to dovetail with the blades 16. The extreme end face of tip 7 is provided with beveled notches 18 to co-act with the bevels on the interior of shoe 1 to support the weight of the carrier. The interior wall of tip 7 is provided with a recess 19 extending from each blade slot to receive the extension 20 of blade 16. The sleeve 8 is provided with a central longitudinal passage through which the shaft 21 of lock head 9 is free to slide. To prevent relative rotation a feather 22 may be attached to shaft 21 to slide in a corresponding keyway in sleeve 8. An optional construction is shown in Figure 10a (adaptable to a cast construction) in which the shaft 21a of lock head 9a is hexagonal to slide in a hexagonal hole in sleeve 8. At the top of sleeve 8 are notches 23 for disengaging the prongs of an installation tool if used. The top edge can be rounded at 24 to avoid snagging on tool joint 4 during removal.

The lock head 9 consists of a main body portion from which the slide shaft 21 extends downwardly and the grip shaft 25 extends upwardly. The grip shaft 25 may be cylindrical with a rounded upper end 26 so that it can be gripped by a slip socket or it can be provided with an annular shoulder so that it can be gripped with an overshot. The main body portion may be provided with longitudinal grooves 27 ending at the annular shoulder 28. These grooves serve two purposes. When the carrier is lowered by cable an installation tool is used, the prongs 101 of the installation tool 102 lying in the grooves 27 and the hook holding under shoulder 28 until the hook end of the prong is pried off by contacting recess 23. During drilling the grooves serve as a passage for circulation fluid. Where the carrier is dropped through the drill pipe without a cable the grooves 27 can be of rougher construction.

The lugs 10 are retained in recesses in the main body portion of lock head 9. The lower end of each lug or barb is reduced in cross section area so that it will fit in the covered portion 29 of the recess. A screw 30 can be passed loosely through a hole in the cover of the recess and screwed into lug 10 to retain the lug in its recess. The upper portion of lug 10 is also reduced in cross section to form an externally facing shoulder 31 and the upper tip is beveled to permit the bowl of the overshot or slip socket to engage and draw the lug into its recess. A semi-elliptical spring 11 may be in the recess behind lug 10 to urge the lug outwardly. The function of shoulder 31 is to engage under the end of tool joint pin 4 to prevent the carrier from being bounced out of position during drilling.

Where the circulation fluid is foul from sand or grit carried thereby the grit may accumulate and pack in the recesses behind lugs 10 to prevent the lugs being drawn or squeezed inwardly by the socket or overshot if the lugs fit snugly in their recesses as shown on the drawings. To overcome this objection the walls of the recesses can be widened out of contact with the lugs except at the ends so that the grit can be squeezed out through the space between lug and recess wall.

The main body portion of lock head 9 above shoulder 31 should obviously be shaped to cooperate with whatever size bowl is on the overshot or socket used for removing the carrier with dull blades.

The core receiving tube 12 can be ordinary pipe, seamless tubing or aeroplane tubing of proper size. The tube is connected to shaft 21 of lock head 9 by a coupling 13. Coupling 13 should have a port 32 for venting fluid expelled ahead of the incoming core and may optionally be provided with a check valve such as ball valve 33. Although the use of a check valve is almost essential in most other forms of core drill it is not so necessary with the collapsible rotary core drill because the core is brought to the surface so quickly and furthermore the carrier tube protects the core from pressure and current liable to wash it out of the barrel. The core tube 12 can be made in sections, the lowest section being mandril 14 which should be strong to withstand crushing between the blades and of slightly smaller internal bore than core tube 12. The core cutting shoe 15 is attached to mandril 14 and should have a smaller bore than the mandril. The bore may also be tapered to enlarge upwardly for some formations. A shoulder 34 is formed at the top of the core shoe and ordinarily this shoulder is sufficient to retain the core instead of a core gripping device. Any of several known forms of gripping devices can be selected to suit individual formations if necessary. A variety of forms of teeth can be used such as the mill teeth 35 shown in Figures 1 and 2, the annular apron form or other forms. Where a core is not desired a small fishtail bit can be substituted for the core bit.

Details of blades 16 are shown in Figures 14 to 22 and in other figures. Each blade can be described as having inner, outer, advance, rear, upper end, and lower end faces. The inner face is the one which contacts mandril 14 and should be curved as at 36 to fit the mandril surface. The outer face 37 should be formed to fit the bottom of slots in the main shoe 1. The advance face 38 is the face leading in the direction of rotation. The lower portion is flat narrowing upwardly from the cutting edge 39. The upper portion is thickened or raised, the raised portion 40 having arcuate dovetail recesses to co-act with carrier tip 7. The lower portion of the advance face should be faced as at 41 with a wear resistant material and if desirable inset with diamond substitutes. For real hard rock a blunt blade set with diamonds may be used. The rear face 42 may be flat, narrowing upwardly, with arcuate dovetail recesses 17 in the upper portion. The lower end face 43 is the rear flank of the cutting edge 39. The upper end face is small in area and fits the end of the slot in carrier tip 7. The dovetails are curved to swing about the upper end face as a center. The uppermost dovetail projection on the blade is beveled inwardly as at 44 and the corresponding recess of the tip 7 is beveled outwardly so that the upper end of the blade cannot be forced inside the carrier tip. A spring extension 20 is riveted to, attached to, or integral with the blade at the upper end so that when the blade is in position in the carrier the spring urges the lower ends of the blades to spread.

The lower part of the outer face is cut back as at 46 so that when in drilling position the blades will cut a hole of uniform size as they wear back instead of cutting a hole of decreasing diameter which would be the case if the face 37 were continued straight.

To insert a blade in the carrier tip the spring 20 is inserted into the slot first with the blade slanted out about 43 degrees and the bevels at 44 preventing the upper end of the blade from going inside the tip 7. The lower end of the blade is swung inwardly on an arc having its center at the upper end of the blade and the dovetails having the same center will mesh to retain the blade in the carrier tip 7. To disengage the blade 5 the lower end is swung outwardly until the dovetails disengage and the blade can be pulled away. It will be observed that while the carrier is within the drill pipe it is impossible for the blades to swing far enough out to be accidentally disengaged.

The blades are intended to operate in pairs as shown in Figures 1 to 4. When descending through the pipe the advance faces overlap each other in contact as shown in Figures 3 and 4, the plane of contact being through the axis of the carrier tip 7.

For efficient operation the relative lengths of the telescoping members of the carrier are important. Lengths can be adjusted by having several lengths of coupling 13 to select from and the use of shim disc for exact adjustment. Figure 2 shows the assembly in drilling position. The position of mill teeth 35 relative to cutter edges 39 should be adjusted to suit the formation: in some formations the teeth 35 should be below or ahead of edges 39 and in others should be above or behind the edges. When installing or removing the carrier the lock head 9 is drawn out through sleeve 8 until shoe 15 is slightly above the upper end of the blades so that the blades are free to collapse to overlapping relation. The length of travel of shaft 21 relative to tube 6 is regulated by the length between shoulder 28 and coupling 13 which in turn can be altered by changing the depth of screw recess on the coupling.

Figure 5:
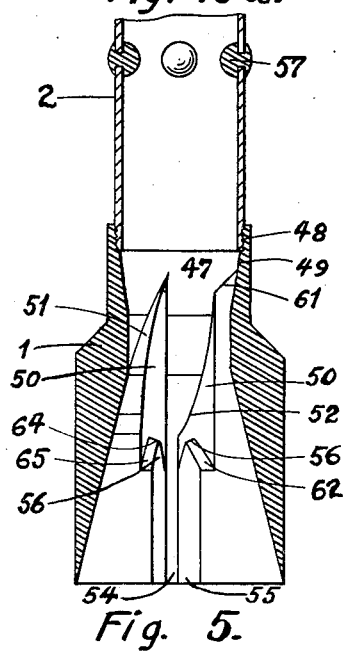
Figure 9:
Figure 14:
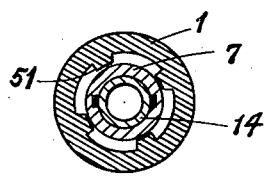
Figure 10:
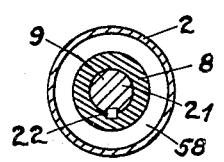
Figure 15:
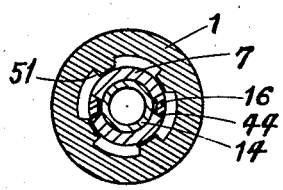

A most important part of the entire core drill is the internal design of the main shoe 1 of the outer organization. Figure 5 illustrates the internal construction. The shoe is provided with a central bore or passage 47 which has screw threads 48 at the upper end for attachment to outer tube 2. The internal bore is tapered as at 49 to converge downwardly for a short distance and for an additional distance may or may not be straight. Guide ribs 50 having smooth faces 51 facing rearwardly to the direction of rotation and also inclined at a steep angle sloping rearwardly are disposed on the internal surface commencing near the top of taper 49 and extending downward to points 52 corresponding to the position for shoulder 53 of blades 16 at which point the distance between ribs must be more than the full width of the blade. From points 52 the smooth faces 51 continue steeply downward until they meet the walls of slots 54. The internal crests of ribs 50 may be bored to a diameter to fit loosely about carrier tip 7. The advance facing side of each rib may be of any form such as will not hamper the seating of the blades. Instead of the square cross section for the rib as shown in the drawings a triangular form sloping from the crest has been found satisfactory.

The slots 54 commence at the lower end of shoe 1 and extend upwardly. The outer walls taper to converge upwardly. The advance and rear walls (referred to rotation direction) are nearly parallel and spaced apart the proper distance to receive the blades between them. The rearwardly facing walls of the slots lie in the plane through the central axis of the shoe. The slots radiate from bore 47. The slots 54 are widened above the points 52 and blend with the recesses between the ribs 50.

The lower portion of the bore 47 is constricted as at 55 to a diameter such that the mandril 14 can slide loosely therethrough. At the top of the constricted portion gable-like shoulders 56 are formed for a purpose hereinafter described.

The outer tube 2 may be a piece of upset rotary drill pipe. The upset at the lower end may be cut off to permit a greater circulation passage as it is not necessary for strength so close to the bottom of the drill column. In order to center the carrier just before it seats projections on the interior wall of tube 2 may be provided, as by means of rivets 57, the diameter between the projections being slightly larger than the diameter of carrier tube 6 to permit a loose fit. A second set of similar projections may or may not be provided higher up to ward shoulder 24 away from the end of tool joint 4 during removal of the carrier.

Operation of the collapsible rotary core drill is as follows: Figure 2 shows the assembly as it is operated on bottom. Drilling is done by rotating the drill pipe and drill and feeding both downward. Circulation flows down the drill pipe, through grooves 27, through the annular passage 58 between carrier and outer organization, and discharges through the slots 54 which are not occupied by blades.

When the cutters are believed dull or when sufficient core has been taken the drill pipe is pulled up and hung on clips from the rotary table and the grief stem or swivel is disconnected. The drill pipe and table can be rotated while fishing out the dull cutters.

A slip socket (or overshot if carrier is fitted with grip for overshot) is attached below a set of jars and sinker bar and lowered through the drill pipe by a cable until the socket slips over the grip shaft 25. A few blows are given with the jars to force the bowl over lugs 10 to squeeze or draw in the lugs until shoulder 31 can clear the end of tool joint pin 4. The blows also drive the entire carrier downward a fraction of an inch so that the blades are loosened in the tapered slots into which they become wedged by drilling pressure. The bowl of the socket should be of the correct size to slip over and grip shaft 25 and also draw in the lugs but in other details it is constructed on the same principles as slip sockets of common use. The same remarks apply to the overshot if used.

When the cable is pulled up the socket drags lock head 9 upward telescoping shaft 21, core tube 12, mandril 14, and shoe 15 through carrier tube 6 to the position shown in Figure 3. The core shoe 15 being no longer between the blades, the blades are free to collapse to the overlapping position shown in Figure 3 when dragged up through the slots.

The cable is hauled upward drawing the carrier through the drill pipe to the surface. At the surface the dull blades are removed, the core tube is disconnected by unscrewing sleeve 8 and coupling 13, the core is removed for inspection, and the carrier is re-assembled with sharp cutters.

It may be mentioned here that two or more carriers greatly increase efficiency because a carrier with sharp cutters can be installed as soon as the dull carrier reaches the surface. Drilling can then proceed while the dull carrier is being prepared for the next run.

A carrier with sharp cutters can be installed by lowering with a cable or by dropping through the drill pipe. When lowered by cable an installation tool can be used. When dropped in the assembly shown in Figure 3 is placed in the drill pipe at the derrick floor and allowed to fall freely to bottom. The thick muddy fluid which is usually used for circulation retards the rate of descent to a safe speed.

In descending the spring extensions 20 urge the blades outwardly so that the corner 59 rubs along the interior wall of the pipe and the beveled portion 46 skids the blades over rough places and upsets without "snagging" the carrier. The blades cannot spread far enough while in the drill pipe to permit the mandril to telescope between them. The lugs 10 are urged outwardly by springs 11 and each time the lock head passes an upset in the pipe the lugs drag a little on the narrow bore to retard the head and prevent telescoping of the mandril between the blades prematurely.

When the carrier approaches bottom it passes between the knobs or projections 57 which serve to center it accurately over the main outer shoe 1. Continuing downwardly the tip end corner 60 of the blade engages the steeply inclined face 51 of a guide rib 50 which twists the carrier a fractional turn in a counter rotation (left hand) direction and guides blade 16 into a slot 54. Should the corner 60 fail to properly engage a face 51 of a rib 50 because of striking "dead center" on the tip end, the blade will be forced inward by the beveled end 61 to ride over the crest of the rib and continue to gable 56. The crest 64 of gable 56 is placed rearwardly (referred to rotation direction) of the top and of rib 50 so that the descending blade 16 will strike on face 62 with the result that the carrier is twisted slightly in rotation (right hand) direction to guide the blade into a slot. It will also be observed that the crest 64 of gable 56 is slightly in advance of guide face 51. If only one blade is engaged by a guide face 51 it will be guided into its slot and twist the carrier but the opposite blade may "dead center" and ride the crest of the rib while twisting. If the rear facing flank 65 of gable 56 were vertical the blades would jam. For this reason the flank 65 is inclined so that the corner 60 which has been twisted nearly to the proper slot engages flank 65 and is guided into the slot opposite the first blade without jamming.

In some of the first experimental runs with the overlapping type of blade (Figures 19 to 22 as distinguished from the symmetrical non-overlapping type of blade) occasional difficulty was encountered with the corners 63 of the blades jamming on the corner 64 of the gable. This was partially overcome by sloping the flange 65 as mentioned in the preceding paragraph and in addition by placing an angle face 66 on the blade so that the offending corner could not jam because of the blade being guided by the corner 60 engaging its guide earlier. The corners 64 of the gable should be blunted so as not to "snag" the shoe 15.

It will be seen that the double set of guides eliminates the danger of the blades jamming on "dead center". In designing each individual size of drill care must be observed to have the height of the guide ribs exceed the height of the beveled corner 46 of blades 16 so that the corner 60 will be sure to engage a rib.

With the blades guided into slots 54 the carrier continues downward until the carrier tip 17 is arrested by gable 56. The end of tip 17 is notched to mate gable 56 in order to distribute the weight. When the carrier tip and tube stop the inner members telescope through them forcing mandril 14 between blades 16 as a wedge to spread the blades into drilling position. Lengths of the members are selected so that when telescoping is stopped by shoulder 28 contacting sleeve 8 the barbs or lugs 10 spread out and hook below the end of the tool joint pin to retain the carrier in position. It may be mentioned here that when the carrier is seated the shoulder 31 of lug 10 should be a fraction of an inch below the end of tool joint 4 so that the blades 16 are loose in the taper of slots 54.

When the carrier is in position, the swivel or grief stem connected, and the pumps started, drilling can be resumed. When the core drill reaches bottom the blades are forced back into the tapered slots and wedge so that the mandril and blades are held firmly and prevented from vibrating.

Referring to Figures 1 and 23 it will be observed that the cutters are arranged in the common fishtail form. The fishtail bit "wobbles" during drilling so is not a very good coring bit. To overcome the "wobbling" external longitudinal fins 67 are provided on the main shoe 1 by making the head of square external cross section. The fins 67 rub on the wall of the well to prevent the drill "wobbling". Figure 17a illustrates a modified form of shoe in which plain fins 67a project from a cylindrical body. In the square head circulation discharges from the slots and passes upward between the flat side of the shoe and the cylindrical wall of the well.

Figure 17b illustrates a form of shoe 1b in which the fins are reaming fins 67b. Each fin has a longitudinal strip of diamond substitute 68 inset in hard facing 69 along the extreme outer margin so that the periphery is prevented from wearing back any faster than the inner portion of the fin. With this arrangement the reamer fin can wear back its full length without losing its cutting qualities so that it does not require frequent removal for sharpening. The reaming fins enlarge the hole cut by blades 16 and hold the core drill centered.

It is preferable to use blades in pairs and to have four slots as shown on the drawings. The blades occupy one pair of slots leaving the remaining pair unoccupied so that circulation fluid can discharge through the unoccupied slots. However it is possible to use the basic principles of my invention with different numbers and arrangements of slots and blades. In the drawings of the lock head 9 three lugs 10 and three grooves 27 are shown as the most satisfactory number although other arrangements and numbers can be used.

It will be understood that various changes in detail of construction may be made without departing from the spirit or scope of the invention as defined by the appended claims.

I claim as my invention:

1. In a rotary drilling apparatus: a rotary drill pipe provided with a terminal fitting adapted to receive cutting blades; and an interior bodily removable organization including said blades, means for expanding said blades into said fitting and a core barrel extending between and above said blades, the lower portion of said blades being collapsible to overlap each other when unexpanded.

2. A core drill for use on a string of rotary drill pipe in a well including an outer case, a terminal fitting thereon, an inner core receiving tube, and cutters adapted to cut a hole of larger diameter than said case, said tube being enclosed within said case and said cutters within said fitting, the lower portion of said cutters being collapsible to overlap each other below the core tube so that the tube and cutters may be installed and removed through the drill pipe without removing the drill pipe and case from said well.

3. In rotary well drilling means: a head; collapsible cutting blades movable relatively thereto; and an expanding member vertically movable between said blades, to cam the same into expanded positions; said expanding member being provided with core-cutting means movable between said blades.

4. In a rotary well drilling means; a head; collapsible cutting blades movable relatively thereto; and an expanding member vertically movable between said blades, to move the same into expanded positions; said expanding member being provided with core-cutting means movable between said blades; and means rendering the rotation of said blades effective to rotate said core-cutting means, the external diameter of that portion of the expanding member between the blades being no greater than the minimum distance between blades when in expanded position.

5. In means of the general character described: an exterior organization comprising a fitting provided with recesses adapted to receive upwardly removable main cutting blades; and an interior organization vertically movable with reference thereto and embodying such blades and core-cutting means adapted to extend said blades into said recesses by movement therebetween.

6. In means of the general character described: a hollow exterior organization secured at the lower end of a rotary drill pipe string and provided with means for imparting rotation to expansible blades; an interior organization vertically removable therethrough and comprising blade supporting means; expansible blades supported thereby; and core-cutting means longitudinally movable relative to said blades for expanding the same, the inner faces of said blades being in a cylindrical surface concentric with the longitudinal axis of the tool and of a diameter not less than the external diameter of the core bit when said blades are in expanded position.

7. In means of the general character described: a drill head provided with slots to receive removable blades; blades vertically movable through said head and expansible within said slots; means for rotatively guiding said blades opposite said slots, regardless of their initial angular relationship thereto; and core-receiving means adapted to engage the inner surface of said blades and to expand said blades into said slots, the lower portion of said blades being collapsible to overlap each other when unexpanded.

8. In means of the general character described: a drill head provided with slots to receive removable blades; blades vertically movable through said head and expansible within said slots; means for guiding said blades opposite said slots; and means for then expanding said blades, said expanding means embodying the lower end of a core barrel, the lower portion of said blades being collapsible to overlap each other when unexpanded.

9. In means of the general character described: a drill case comprising a terminal fitting adapted to receive blades and transmit rotative movement thereto; and an interior and bodily removable organization comprising pivotably suspended cutting blades and an expanding member movable therebetween provided with means for taking a core, said interior organization being provided with core-cutting means and with a core barrel above said blades.

10. In means of the general character described the combination of: an intermediate supporting case having a recess formed downwardly therein, said recess having slots formed in opposite faces thereof; a cutting blade provided with substantially parallel lateral faces and with interfitting supporting members disposed laterally thereof adapted to be received by said slots; and moving means for said blades comprising a vertically movable bit therebetween adapted to take a core.

11. A core drill comprising an outer organization attachable to the lower end of a string of rotary drill pipe and including a terminal shoe provided with four blade receiving slots; and an interior bodily removable organization including a tube, a pair of overlapping blades suspended from said tube by dovetails, and a core receiving tube telescopically disposed within said tube and adapted to spread said blades into a pair of opposite slots by moving to a position between said blades; the pair of said slots not occupied by said blades forming passages for circulation fluid.

12. In a rotary well drilling means: a hollow exterior organization secured at the lower end of a rotary drill pipe string and provided with means for imparting rotation to expansible blades; and an interior bodily removable organization comprising core leaving expansible blades dependently supported from an intermediate member thereof, and a core-receiving expanding member therein having limited vertical movement relative to said intermediate member, said expanding member being provided with releasable locking means to hold same down and with means for engagement with a recovery tool, supported by a cable, for unlocking and removing said interior organization.

13. In a rotary well drilling means: a hollow exterior organization disposed at the lower end of a rotary drill pipe string and provided with slots to receive removable expansible cutting blades, said slots being downwardly expanded; an interior bodily removable organization comprising upwardly tapered expansible cutting blades and an expanding member movable between said blades which is provided with a core-cutting bit at its lower end; and means for transmitting end thrust from said bit to said exterior organization independently of said cutting blades, said cutting blades being upwardly tapered substantially throughout their length for a wedging effect favorable to lessen vibration and to transmit thrust direct from said blades to said exterior organization.

14. A terminal member for a string of drill pipe comprising a shoe provided with a central longitudinal passage, a plurality of blade receiving slots radiating from said passage, inclined guide ribs along the wall of said passage between and leading to each slot, and gabled shoulders on the wall of said passage between each slot and below the upper ends of said ribs.

15. A terminal member for a string of rotary drill pipe comprising a shoe provided with a central longitudinal passage having a large end and a small end, a plurality of blade receiving slots radiating from the small end of said passage, inclined guide ribs along the wall of said passage leading from the large end to each slot, and inclined shouldered gables on the wall of said passage between each slot and below the upper ends at said ribs.

16. In a rotary well drilling means: a head; collapsible cutting blades movable relatively thereto and expansible into said head; and a tubular expanding member vertically movable between said blades, to move the same into expanded positions in said head; a tubular intermediate member disposed externally of said expanding member, supporting said blades and adapted to co-operate with said expanding member for moving said blades into expanded position, said expanding member and said intermediate member being telescopically connected and bodily removable from said drill head while said head is attached to a drill string.

17. For use in combination with a drill pipe having a terminal fitting thereon; a rotary core drill organization adapted to be received by said terminal fitting and embodying a tubular carrier, a core barrel enclosed within said carrier; means for positioning and locking said core barrel and carrier in said terminal fitting; and means for unlocking and withdrawing said carrier and core barrel through said drill pipe, the position of said carrier when locked being entirely above the lower end of said terminal fitting.

18. For use in combination with a drill pipe having an internally slotted terminal fitting thereon; an interior rotary drill organization bodily removable through said pipe and embodying a tubular intermediate case, cutting blades carried by said case, a tubular expanding member telescopically mounted within said case, and a terminal cutting bit on said expanding member longitudinally movable between and in contact with said blades to expand said blades into the slots of said fitting.

19. A rotary drill embodying three telescopically connected tubular members, namely, an outer tubular case having an internally slotted terminal fitting thereon, a tubular intermediate case supporting expansible blades pivotally mounted thereon, and a tubular expanding member within said intermediate case having a terminal bit thereon which is longitudinally movable between and in contact with said blades to expand the blades into the slots of said fitting, said intermediate case, expanding member, blades and bit being included in an interior organization which is bodily removable through said outer case.

20. In means of the general character described: a drill pipe; a fitting therebelow provided with separately movable blades; and a core-cutting bit adapted to be lowered and removed between said blades, and releasable means for locking said core-cutting bit against longitudinal movement relative to said fitting.

21. A core drill comprising an outer organization including a terminal shoe provided with blade receiving slots and an interior bodily removable organization including a head member provided with recesses, lugs held in said recesses in such manner that the upper end of said lug is free to move outwardly and the lower end is restrained from moving outwardly, and a spring member between said head member and each lug urging the lug outwardly.

22. In means of the general character described: a drill pipe; a fitting therebelow provided with cutting blades; a blade-expanding member vertically movable between said blades and adapted to be lowered and recovered through said pipe; and releasable spring controlled means for locking said expanding member against longitudinal movement relative to said fitting.

23. In means of the general character described: a rotary drill case comprising a terminal fitting adapted to receive blades; and an interior organization comprising cutting blades and an expanding member movable therebetween bodily removable with blades and member as a single unit upwardly through the drill case, said drill case comprising a member provided with integral reaming fins.

24. A cutter for a rotary well drill having a narrow end, an outer face, a concave face opposite said outer face, said faces diverging from said end, parallel side faces provided with arcuate dovetails adjacent said end, the centers of the arcs being on said end, one of said side faces continuing in the same plane to the opposite end and one of said side faces continuing to the opposite end in a plane midway between said dovetails, and an opposite end face beveled to form a cutting edge on the plane midway between said dovetails.

25. A cutter for a rotary well drill having a narrow end, an outer face, a concave face opposite said outer face, said faces diverging from said end, parallel side faces provided with arcuate dovetails adjacent said end, the centers of the arcs being on said end, an opposite end face provided with a cutting edge, and a resilient projection attached to one of the curved faces and projecting beyond said narrow end.

26. A terminal fitting for a rotary core drill provided with a central bore and a plurality of longitudinal slots radiating from said bore and adapted to receive removable cutters, said slots being widened circumferentially toward one end of said fitting to form inclined internal shoulders to guide said cutters through said slots and deepened radially toward the opposite end of said fitting to receive said cutters when expanded outwardly for drilling and guide gables on the wall of said bore between said slots adapted to engage the tips of said blades in the event that said inclined shoulders fail to guide said blades.

27. A cutter for a rotary well drill having a narrow end, an outer face, an inner face opposite said outer face, said faces diverging from said narrow end, parallel side faces provided with arcuate alternate ribs and grooves adjacent said end, the centers of the arcs being on said narrow end, and a beveled end face opposite the narrow end intersecting a side face to provide a cutting edge extending from the outer to the inner face.

28. A cutter for a rotary well drill having a narrow end, an outer face, an inner face opposite said outer face, said faces diverging from said narrow end, parallel side faces provided with arcuate alternate ribs and grooves adjacent said end, the centers of the arcs being on said narrow end, and a beveled end face opposite the narrow end intersecting a side face to provide a cutting edge extending from the outer to the inner face, the uppermost arcuate rib being beveled to converge toward the inner face.

GEORGE A. MACREADY.